US012314121B2

(12) United States Patent
Hatfield et al.

(10) Patent No.: US 12,314,121 B2
(45) Date of Patent: May 27, 2025

(54) VIRTUAL COLLABORATIVE SPACE WITHIN A WORKFLOW

(71) Applicant: INTERNATIONAL BUSINESS MACHINES CORPORATION, Armonk, NY (US)

(72) Inventors: Jennifer M. Hatfield, Portland, OR (US); Jill S. Dhillon, Jupiter, FL (US); Cuong The Nguyen, North Richland Hills, TX (US); Tiberiu Suto, Franklin, NY (US); Brian K. Adams, Westerville, OH (US); Neil Delima, Scarborough (CA)

(73) Assignee: INTERNATIONAL BUSINESS MACHINES CORPORATION

( * ) Notice: Subject to any disclaimer, the term of this patent is extended or adjusted under 35 U.S.C. 154(b) by 16 days.

(21) Appl. No.: 18/350,805

(22) Filed: Jul. 12, 2023

(65) Prior Publication Data

US 2025/0021417 A1    Jan. 16, 2025

(51) Int. Cl.
G06F 11/00    (2006.01)
G06F 11/07    (2006.01)

(52) U.S. Cl.
CPC .................. G06F 11/0712 (2013.01)

(58) Field of Classification Search
CPC ............... G06F 11/0712; G06N 20/00
(Continued)

(56) References Cited

U.S. PATENT DOCUMENTS 7,703,667 B2   4/2010   Koorland et al.
10,956,868 B1   3/2021   Cronan
(Continued)

FOREIGN PATENT DOCUMENTS

CN    114663057 A    6/2022

OTHER PUBLICATIONS

Automated Virtual Reality (VR) Workflows in the Workplace, How Virtual Reality Is Emerging as an Element of Automated Workflows, perfect apps, Sep. 30, 2022, Retrieved from Internet Apr. 24, 2023: https://www.perfectapps.com/how-virtual-reality-is-emerging-as-an-element-of-automated-workflows/, 3 pages.
(Continued)

*Primary Examiner* — Sarai E Butler
(74) *Attorney, Agent, or Firm* — CHIP LAW GROUP

(57) ABSTRACT

A method, computer program product, and computer system for creating a virtual collaborative space within an intelligent workflow framework. One or more processors of a computer system identify the need for a virtual collaborative space where human interactions can occur to test or optimize the existing workflow and identify triggers for when the virtual collaborative space shall be initiated based on historical learning models trained from instrumentation data generated by the workflow. Responsive to a trigger from the identified triggers, the one or more processors of the computer system alert a first user to enter the virtual collaborative space and initiate the virtual collaborative space. The one or more processors of the computer system replicate a scenario that activated the trigger including identifying parties of interest to the scenario and enable the first user to address an issue in the existing workflow that caused the trigger to occur.

20 Claims, 8 Drawing Sheets

(58) Field of Classification Search
USPC .......................................................... 714/1–57
See application file for complete search history.

(56) References Cited

U.S. PATENT DOCUMENTS

| | | |
|---|---|---|
| 11,265,513 B2 | 3/2022 | Schmirler et al. |
| 11,308,697 B2 | 4/2022 | Rakshit et al. |
| 2006/0053195 A1 | 3/2006 | Schneider |
| 2007/0215683 A1 | 9/2007 | Koorland et al. |
| 2009/0177920 A1* | 7/2009 | Richards .............. G06Q 20/102 |
| | | 715/764 |
| 2012/0030289 A1 | 2/2012 | Buford |
| 2012/0192275 A1* | 7/2012 | Oliver ..................... G06F 21/51 |
| | | 726/24 |
| 2013/0061155 A1 | 3/2013 | Hon |
| 2013/0111357 A1 | 5/2013 | McCormack |
| 2016/0155187 A1* | 6/2016 | Paulrajan ........... G06Q 30/0643 |
| | | 705/27.2 |
| 2020/0336706 A1 | 10/2020 | Schmirler et al. |
| 2021/0082186 A1 | 3/2021 | Rakshit et al. |
| 2022/0309037 A1* | 9/2022 | Gutierrez ................ G06F 16/16 |
| 2022/0317830 A1 | 10/2022 | Skuratowicz |
| 2023/0221796 A1* | 7/2023 | Aloisio .............. G06Q 10/0639 |
| | | 715/757 |

OTHER PUBLICATIONS

Anonymous, Method and System for Project Plan Refinement Based on Virtual Reality Interaction, IP.com No. IPCOM000270922D, IP.com Electronic Publication Date: Sep. 13, 2022, 4 pages.

* cited by examiner

VIRTUAL COLLABORATIVE SPACE WITHIN A WORKFLOW

BACKGROUND

The present invention relates to intelligent workflow frameworks, and more specifically, to creating a shared virtual collaborative space within an intelligent workflow framework.

SUMMARY

Embodiments of the present invention provide a method, a computer program product, and a computer system, for creating a virtual collaborative space within an intelligent workflow framework.

One or more processors of a computer system identify the need for a virtual collaborative space where human interactions can occur to test or optimize the existing workflow. The one or more processors of the computer system identify triggers for when the virtual collaborative space shall be initiated based on historical learning models trained from instrumentation data generated by the workflow. Responsive to a trigger from the identified triggers, the one or more processors of the computer system alert a first user to enter the virtual collaborative space. Further responsive to the trigger, the one or more processors of the computer system initiate the virtual collaborative space. The one or more processors of the computer system replicate a scenario that activated the trigger including identifying parties of interest to the scenario and enable the first user to address an issue in the existing workflow that caused the trigger to occur.

DETAILED DESCRIPTION

Overview

Figure 1:
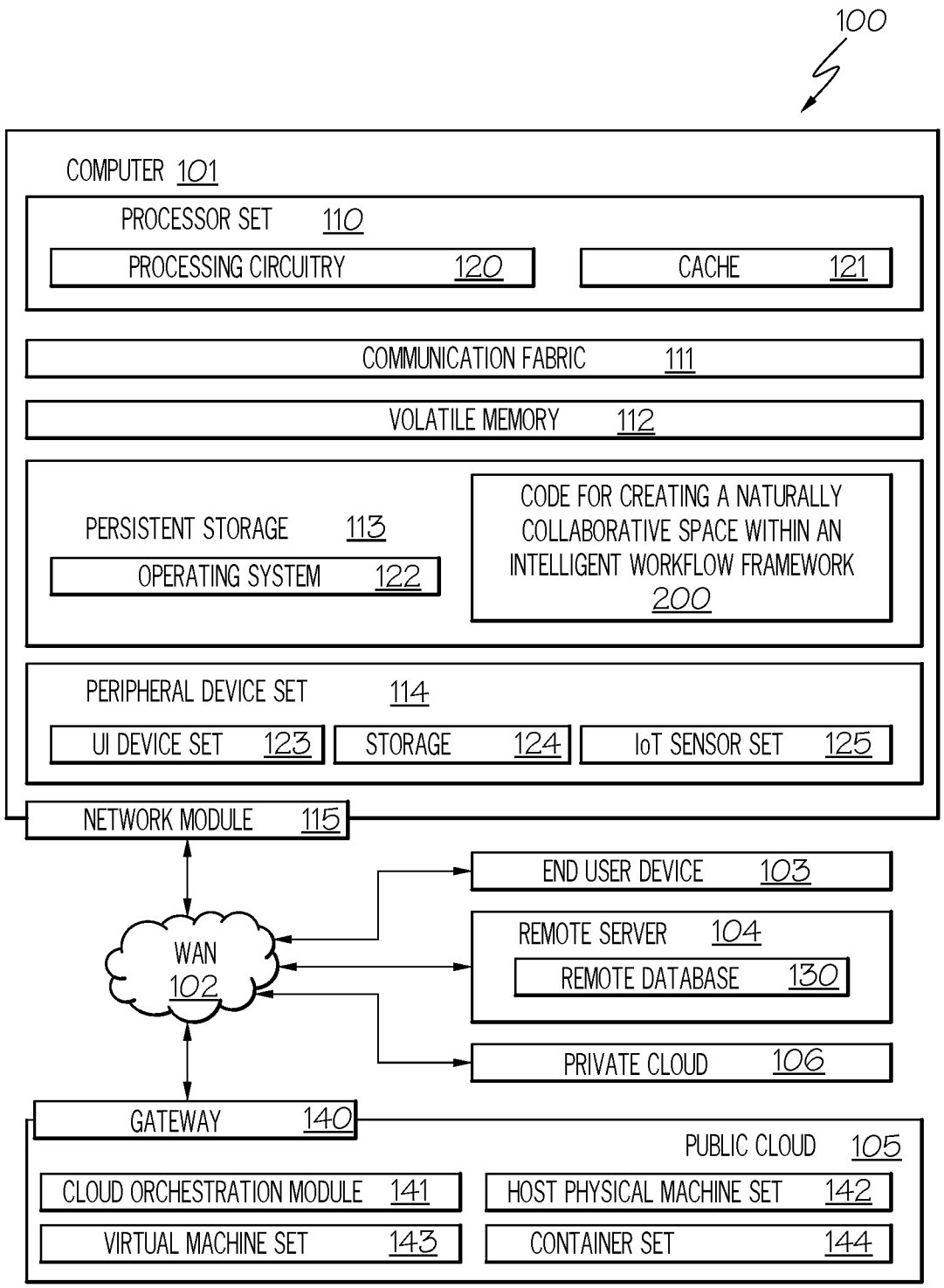
FIG. 1 depicts a computing environment which contains an example of an environment for the execution of at least some of the computer code involved in performing the inventive methods, in accordance with embodiments of the present invention.

Testing of intelligent workflows is often absent of human participation. Process mining software is run, and data is presented. In these systems, the user experience is not fully realized or not prioritized. The present invention recognizes that virtual experiences (e.g., a virtual collaborative space or the metaverse) provide a rich landscape for exploration of intelligent workflows, realization of the user experience via human engagement, and optimization of that process.

This present invention solves the problem related to the challenge of designing and testing repeatable workflows that involve both automation and/or human interaction in the real world. Further, the present invention accounts for exceptions that might occur during the execution of such workflows during the design and test phase. Testing for user research and design purposes that require a human element can be easier to understand and control in a virtual reality environment or collaborative space where repeatable, tested, and measured stimulus can be available to a narrow or wide set of participants or users.

An intelligent workflow framework as described herein may be an automated and intelligent workflow which may be monitored, deployed and/or run via a computer system. An intelligent workflow may be a repeatable workflow and may be virtually or digitally monitored, logged, enhanced, stored, or deployed. In some embodiments, an intelligent workflow as described herein may be a workflow which requires human participation, activity and/or engagement. In some embodiments, a workflow may require various other non-human resources, such as machinery, equipment, computers, real estate, natural resources, products, or the like. For example, an intelligent workflow may be the workflow of a distribution center, supply chain, employee onboarding, or any other defined set of tasks for repeatable completion.

The present invention identifies, within an existing workflow, the need for a virtual collaborative space where interactions and exchanges could occur to test and optimize the workflow. Needs, bottlenecks, dependencies, and any other issues related to the designed workflow may be addressed in this virtually collaborative space. The virtually collaborative space may be initialized and triggered by an alert or issue, or may be established and integrated as part of the workflow and process.

Embodiments described herein include private shared virtual environments which may be created ad-hoc within an intelligent workflow framework. Triggers may be identified by observation and historical learning models trained from a corpus of instrumentation data generated by the workflow (including ratings and severity of urgency levels). When a trigger is active, a user or human (or digital twin acting as a proxy) may be alerted to enter a virtually collaborative space (e.g., a metaverse). The virtually collaborative space may provide a digital twin which replicates the scenario where the trigger happened and identifies parties or team members who may need to address the scenario. The virtually collaborative space may then be created by stems with privacy. Multiple spaces may be active with private rooms within a single virtually collaborative space environment. Permissions and invitations to this virtually collaborative space may be based on a type of workflow and users associated with the workflow, and may be based on user roles, inputs and/or outputs required, timing and location variables, or any other variables, as described herein.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a computing environment 100 which contains an example of an environment for the execution of at least some of the computer code involved in performing the inventive methods, such as code 200 for creating a virtual collaborative space within an intelligent workflow framework. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Process and System for Creating a Virtual Collaborative Space

Figure 2:
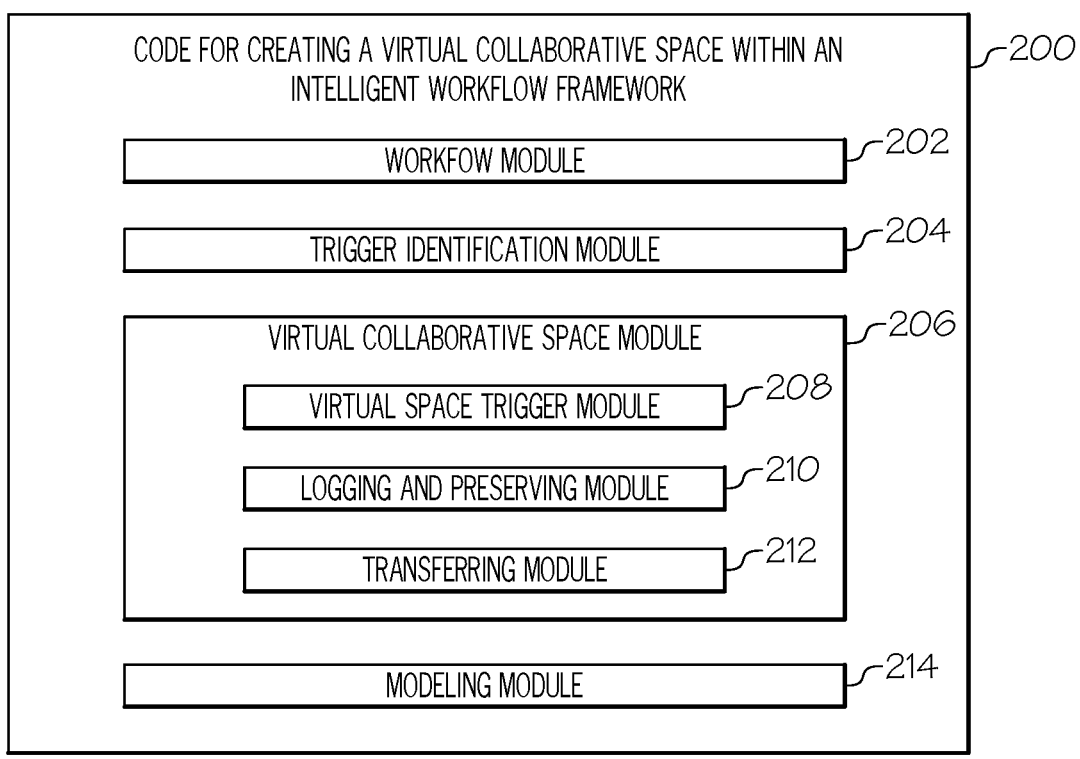
FIG. 2 depicts a block diagram of modules included in computer code included in the system of FIG. 1, in accordance with embodiments of the present invention.

FIG. 2 is a block diagram of modules included in code for creating a virtual collaborative space within an intelligent workflow framework 200, included in the system of FIG. 1, in accordance with embodiments of the present invention. The code for creating a virtual collaborative space within an intelligent workflow 200 includes a workflow module 202, a trigger identification module 204, a virtual collaborative space module 206, and a modeling module 214. The virtual collaborative space module 206 further includes a virtual space trigger module 208, a logging and preserving module 210, and a transferring module 212. The number of modules can vary, and some modules may be combined with other modules or separated into two or more modules in various combinations. The functionality of the modules included in code for creating a virtual collaborative space within an intelligent workflow 200 is discussed in detail with respect to the methodology shown in FIGS. 3-6, which is presented below.

Figure 3:
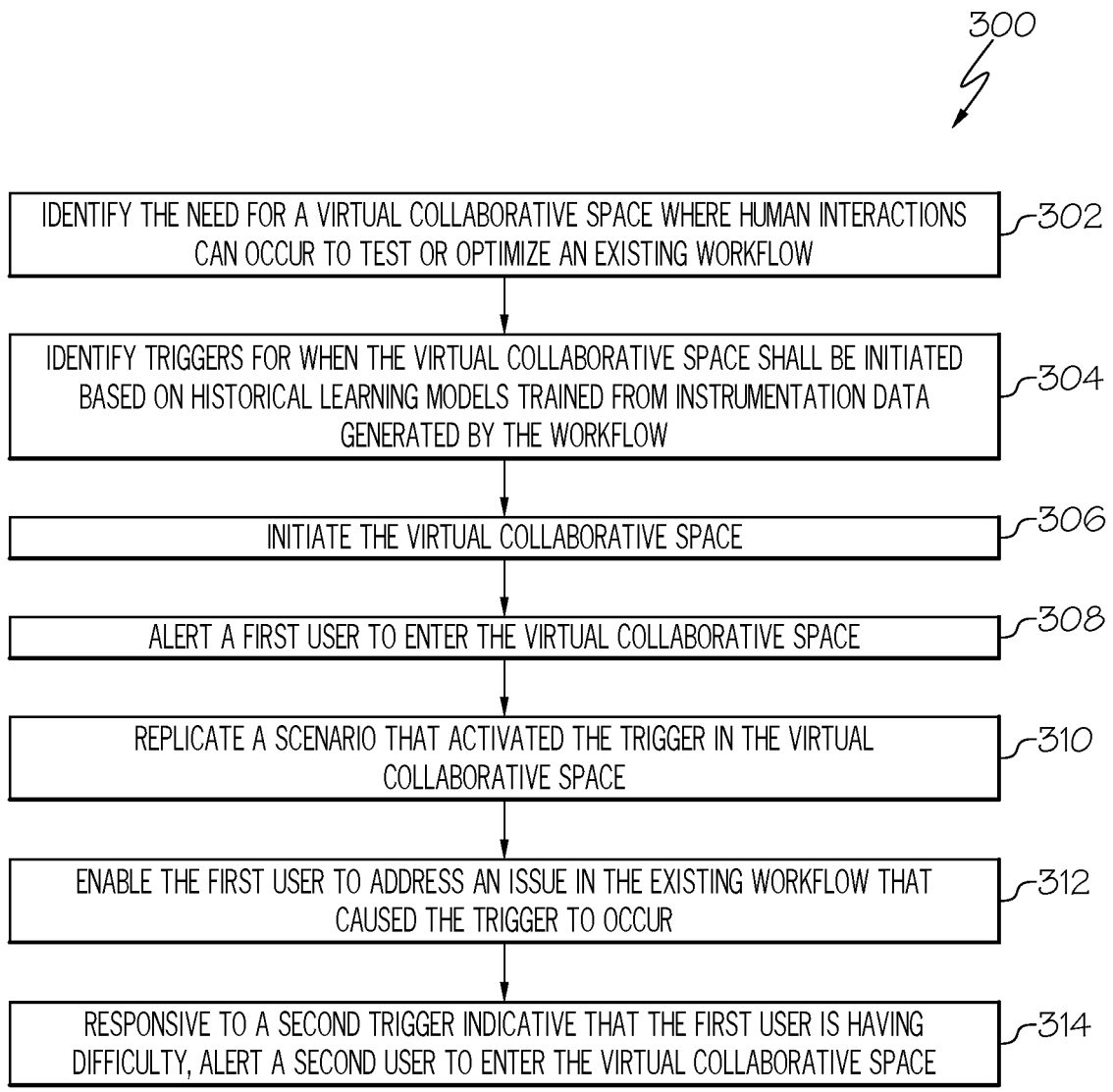
FIG. 3 depicts a flow chart of an embodiment of a method for creating a virtual collaborative space within an intelligent workflow framework, in accordance with embodiments of the present invention.

FIG. 3 depicts a flow chart of an embodiment of a method 300 for creating a virtual collaborative space within an intelligent workflow framework, in accordance with embodiments of the present invention. The method 300 includes a first step 302 of identifying, by one or more processors of a computer system (such as the computer system 100 and/or the computer 101) within an existing workflow, the need for a virtual collaborative space where human interactions can occur to test or optimize the existing workflow. The step 302 may include running an existing workflow, such as by the workflow module 202. The workflow may be any intelligent workflow framework, as described herein above. Further, the step 302 may include identifying a need for a virtually collaborative space, such as by the trigger identification module 204 and/or the workflow module 202.

The method 300 may include another step 304 of identifying, by the one or more processors of the computer system, triggers for when the virtual collaborative space shall be initiated based on historical learning models trained from instrumentation data generated by the workflow. Step 304 may be, for example, performed by the trigger identification module 204. The historical learning models may be trained from instrumentation data by the modeling module 214, for example.

Responsive to the trigger from the identified triggers, the method 300 may include a step 306 of initiating, by the one or more processors of the computer system, a virtual collaborative space. Step 306 may be performed by the virtual collaborative space module 206. The step 306 may include creating the virtual collaborative space by stems with privacy. The step 306 may further include making a plurality of private rooms within a single environment. Still further, the virtual collaborative space may be a digital twin space or a simulation of an event or activity.

Further responsive to the trigger from the identified triggers, the method 300 may include a step 308 of alerting, by the one or more processors of the computer system, one or more users to enter the virtual collaborative space. The step 308 may also be performable by the virtual collaborative space module 206, and may include determining permissions and invitations to the virtual collaborative environment based on type of workflow and users associated with workflow, and may further be based on user roles, inputs/outputs required, timing and location variables.

The method 300 then includes a step 310 of replicating, by the one or more processors of the computer system in the virtual collaborative space, a scenario that activated the trigger. The step 310 may further include identifying parties of interest to the scenario. The step 310 may be performable by the virtual collaborative space module.

The method 300 may then include a step 312 of enabling, by the one or more processors of the computer system, the first user to address an issue in the existing workflow that caused the trigger to occur. Examples of the step 312 are discussed herein below, and may include determining the cause of the trigger and preventing the trigger from occurring in the future. The step 312 may further include replaying the scenario and/or the cause for the creation of the virtual collaborative space.

Finally, responsive to a second trigger occurring within the virtual collaborative space, the method 300 may include a step 314 of alerting, by the one or more processors of the computer system, a second user to enter the virtual collaborative space. The second trigger may be, for example, indicative that the first user is having difficulty completing a task in the scenario within a predetermined amount of time. The step 314 may be performed by the virtual space trigger module 208, which may be configured to determine when an event or trigger occurs within the virtual collaborative space which needs intervention or additional functionality, users, or the like.

Figure 4:
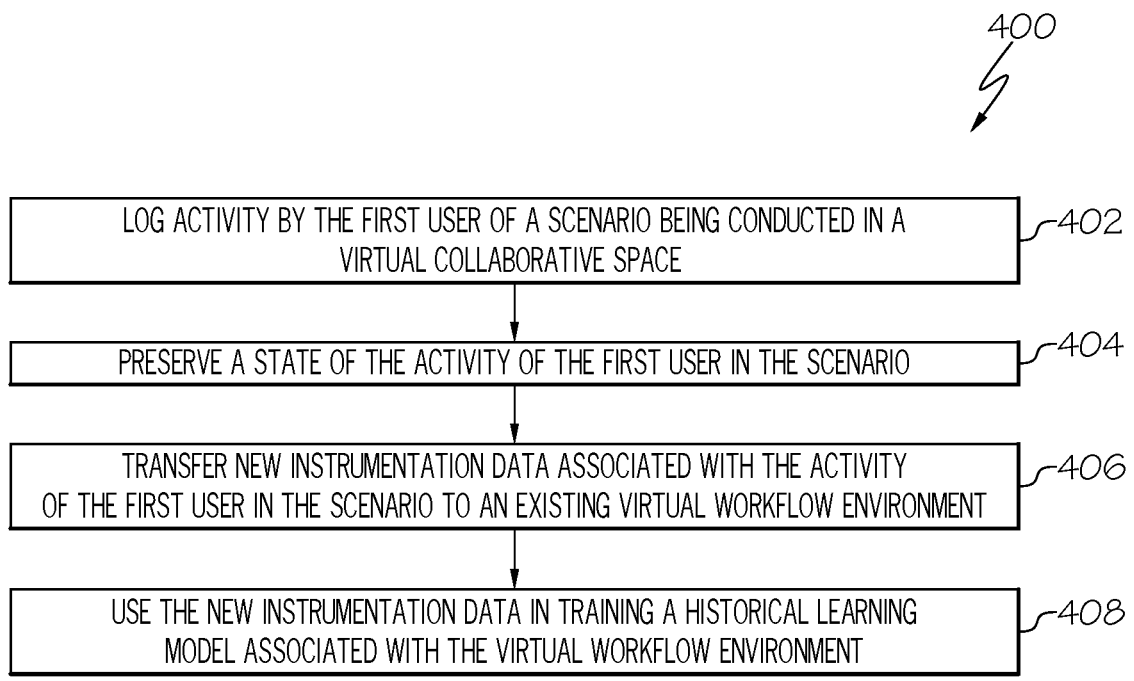
FIG. 4 depicts a flow chart of an embodiment of a method for logging instrumentation data generated within a virtual collaborative space associated with a virtual workflow environment, in accordance with embodiments of the present invention.

FIG. 4 depicts a flow chart of an embodiment of a method 400 for logging instrumentation data generated within a virtual collaborative space associated with a virtual workflow environment, in accordance with embodiments of the present invention. The method 400 may be steps which are incorporated into the method 300 described herein above.

The method 400 includes a first step 402 of logging, by the one or more processors of the computer system, activity by the first user in the scenario. The step 402 may be performed by the logging and preserving module 210 of the virtual collaborative space module 206, described herein above. The method 400 may include a next step 404 of preserving, by the one or more processors of the computer system, a state of the activity of the first user in the scenario. Again, this step 402 may be performed by the logging and preserving module 210 of the virtual collaborative space module 206. The method 400 may then include a step 406 of transferring, by the one or more processors of the computer system, new instrumentation data associated with the activity of the first user in the scenario to the workflow. The step 406 may be performed by the transferring module 212 of the virtual collaborative space module 206.

The method 400 then includes a final step 408 of using the new instrumentation data in training a historical learning model associated with the virtual workflow environment. Thus, methodologies herein contemplated a plurality of AI models (i.e. historical learning models), and regularly updating an AI model as new instrumentation data is received from interactions occurring within the virtual collaborative space. Such instrumentation data may include scenario interaction data, scenario result data, time to scenario completion data, user input data, user invite acceptance data, user participation data, or the like.

Figure 5:
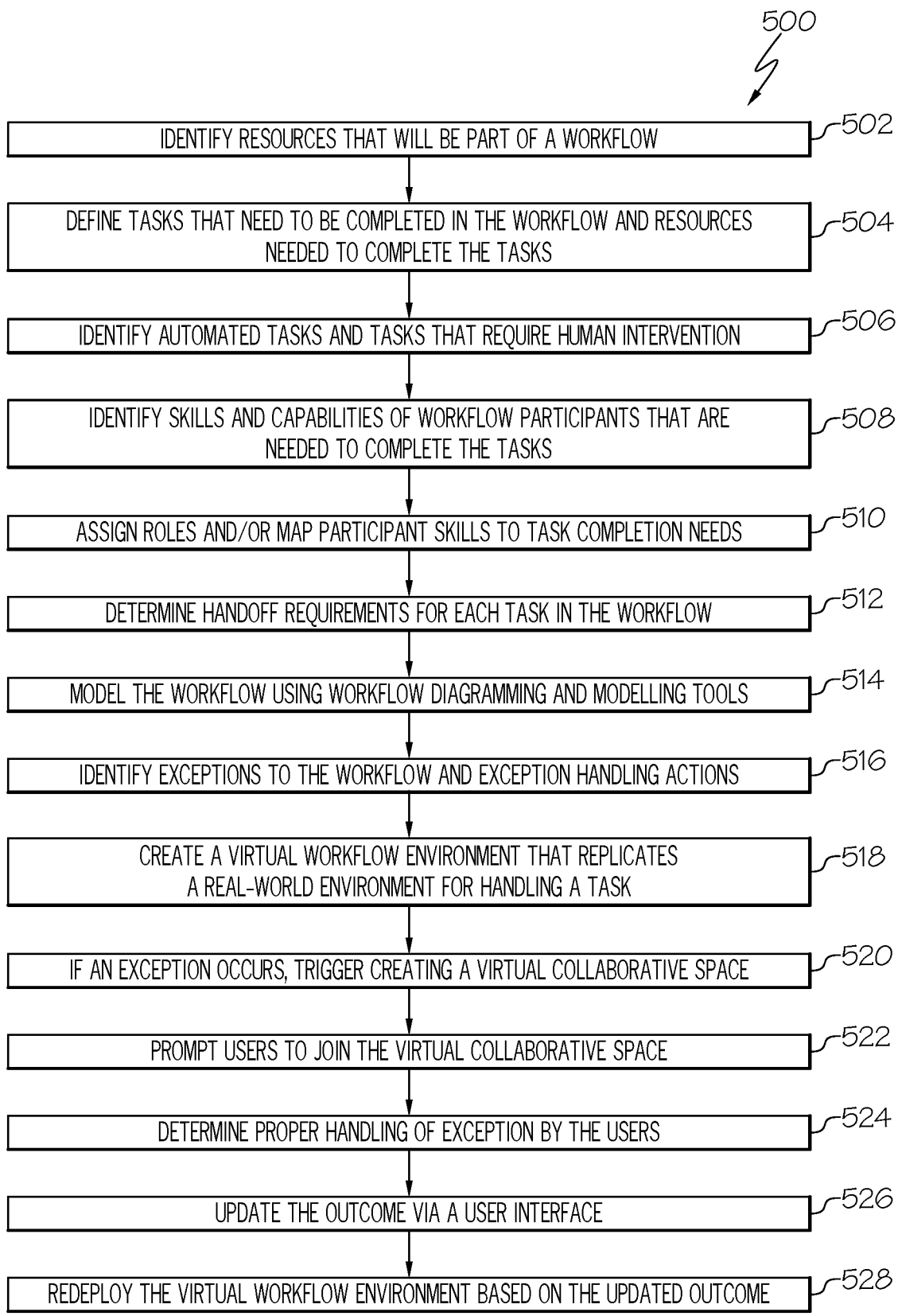
FIG. 5 depicts a flow chart of an embodiment of a method for setting up an intelligent workflow framework, in accordance with embodiments of the present invention.

FIG. 5 depicts a flow chart of an embodiment of a method 500 for setting up an intelligent workflow framework, in accordance with embodiments of the present invention. The intelligent workflow framework may be configured to minimize friction through automation and drive insights for immediate action. The intelligent workflow framework may be configured to launch a step/task in the workflow and assign it to a user for completion in an immersive and/or virtual collaborative environment such as the metaverse, as planned or triggered by an event (either expected or unexpected).

The method 500 may include a first step 502 of identifying resources (e.g., equipment, machinery, real estate, people, etc.) that will be part of the workflow. The method 500 may include a next step 504 of defining the tasks that need to be completed in the workflow and the resources needed to complete the task. The method 500 may include a next step 506 of identifying automated (i.e., straight through processing) and tasks that require human intervention. The method 500 may include a next step 508 of identifying skills and capabilities of workflow participants that are needed to complete tasks that require human intervention and a step 510 of assigning roles and/or map participant skills to task completion needs. The method 500 includes a next step 512 of determining what are the handoff requirements for each task in the workflow.

The method 500 then includes a step 514 of modeling the workflow using workflow diagramming and modelling tools. The step 514 may be performed by the modeling module 214. The modeling module 214 may be configured to receive a corpus of instrumentation data generated by the workflow, including ratings and severity or urgency levels, for example, and use this data to create one or more models of the workflow. The model may account for the resources, tasks, skills of participants, and handoff requirements described in the steps 502, 504, 506, 508.

The method 500 includes a step 516 of identifying exceptions to the workflow and exception handling actions. These exceptions may be determined by the model or may be determined via some human intervention. In any event, the step 516 may include identifying the skills and/or roles required to intervene with an exception or handle exceptions. The step 516 may further include identifying the resources needed, and potential actions to handle the exception.

The method 500 further includes a step 518 of creating one or more virtual workflow environments that replicate real world environments for handling tasks and/or workflow exceptions. The virtual workflow environment may be an environment that is created where access to the physical resource (environment, machinery, etc.) is challenging. The virtual workflow environment created in step 518 may be achieved using Digital Twins or simulations that represent the resources needed to complete the task.

The method 500 includes another step 520 which occurs if an exception occurs within the workflow that does not have a predefined set of handling actions. The step 520 includes performing an assessment that could trigger creating the virtual collaborative environment (i.e., a dynamic virtual metaverse-like environment). The parameters factoring into the assessment could be if there is a diagnostic or exploratory need to determine the proper handling of an action, whereby a virtual collaborative environment could be suited to make such a determination. For example, the system may be configured to assess the modality of the experience required to determine suitability of a virtual collaborative environment to analyze the exception. This can be determined in part by analyzing factors such as the type of task required, the participants availability, and historical usage patterns. If a virtual collaborative environment is determined best suited, one or more users may be prompted to join in a virtual collaborative space. Once the virtual collaborative environment is created, the method 500 then includes a step 522 of prompting one or more users to join the virtual collaborative environment.

At a step 524, the method 500 includes determining a proper handling of the exception by the users. This step 524 may include developing the workflow using existing workflow development tools as per the designed model. For tasks that require human intervention, the task is completed in the virtual collaborative environment by the users. At a step 526, the process of the task in the virtual collaborative environment and/or the outcome(s) to that process may be updated via a user interface, whereby process state data may be passed between the process and the environment during task launch, processing, and completion. The step 526 may include updating the intelligent workflow framework (or virtual workflow environment) with the results of the task completion in the virtual collaborative space.

At a final step 528, the virtual workflow environment may be redeployed based on the updated outcome determined in the virtual collaborative environment. This redeployment or deployment of the workflow may be to a runtime environment.

Figure 6:
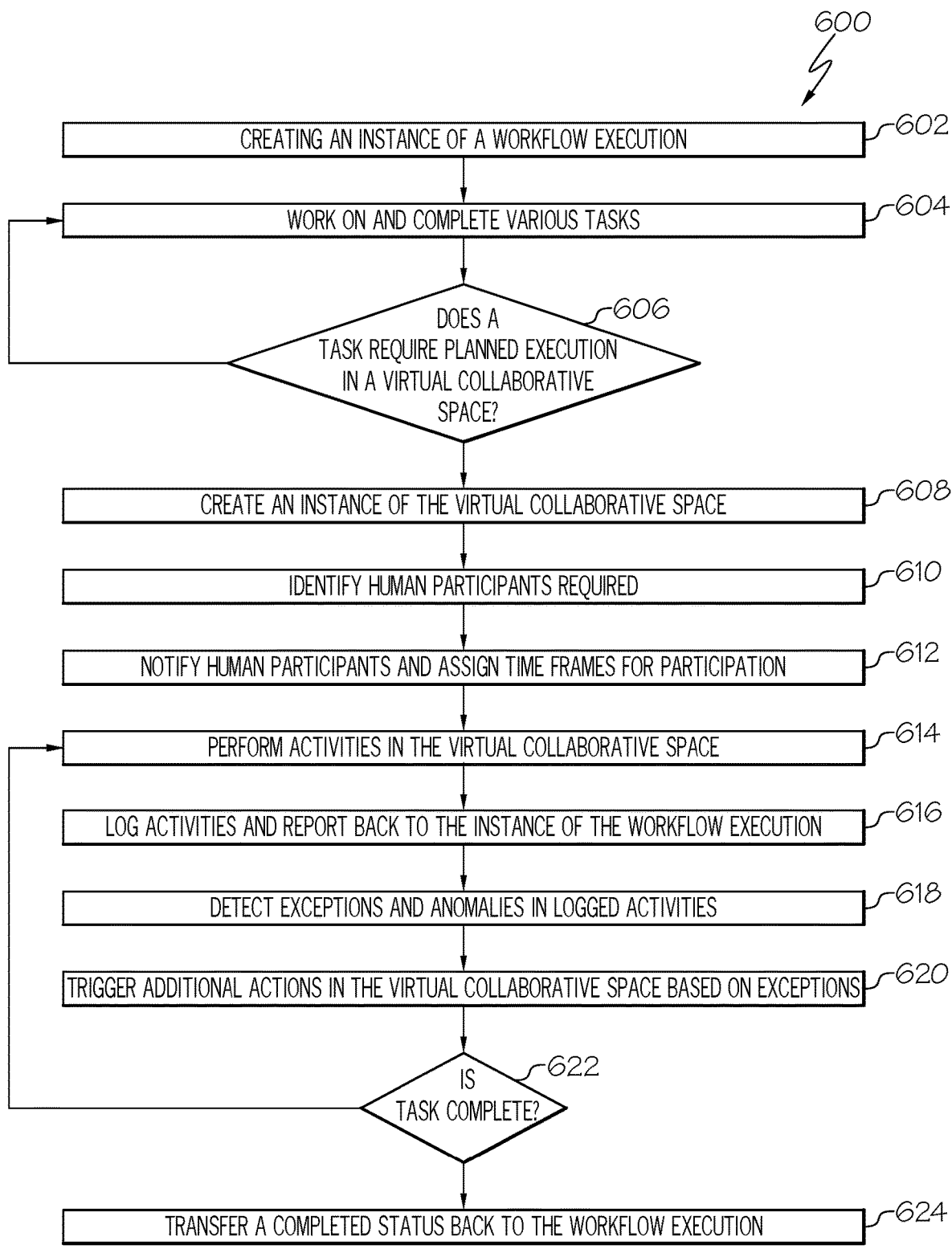
FIG. 6 depicts a flow chart of an embodiment of a method of executing and testing a virtual workflow environment using a virtual collaborative space, in accordance with embodiments of the present invention.

FIG. 6 depicts a flow chart of an embodiment of a method 600 of executing and testing a virtual workflow environment using a virtual collaborative space, in accordance with embodiments of the present invention. The method 600 includes a first step 602 of creating an instance of a workflow execution. The workflow execution may be a virtual workflow environment or intelligent workflow framework, as described in the method 500. The workflow execution may be created and as it runs, whereby various automated tasks and those that require human intervention are worked on and completed, in a step 604.

The method 600 then includes one or more steps 606 of determining whether a task requires planned execution in a virtual collaborative space. If a virtual collaborative environment or space is required, the method 600 continues to the next step. If not, the method 600 reverts back to continuing to complete tasks associated with the workflow. When step 606 determines that a task that requires planned execution in a virtual collaborative environment, or when an exception to the workflow occurs which requires the launching of the virtual collaborative space or environment, the method 600 includes a step 608 of creating an instance of the virtual collaborative space or environment associated with that task or exception action.

The method 600 then includes a step 610, performable by a cognitive engine of the system, of identifying human participants required. The cognitive engine may be configured to determine which human or user participants are required based on associated skills and/or roles needed to complete a task, for example. The method 600 then includes a step 612 of notifying the identified participants. The step 612 may include assigning one or more timeframes for the participants to join the virtual collaborative environment, as well as timeframes for task completion.

The method 600 then includes a step 614 of performing activities in the virtual collaborative space or environment. For example, each virtual collaborative environment may have a series of activities to be performed in the environment to be deemed as complete. The method may include performing this series of activities. In a step 616, the status of the series of activities may be logged and reported back to the workflow to track status of the overall task completion as part of the workflow. Thus, as participants complete assigned activities in the virtual environment, the status of these activities are logged and reported back.

The method 600 then includes a step 618 of detecting exceptions and anomalies in the logged activities. These exceptions can be used, in a step 620, to trigger actions within the virtual collaborative space, such as assigning additional participants with specialized skills or qualifications to join the virtual environment for successful task completion.

The method 600 then includes a step 622 of determine whether a task is complete within the virtual collaborative space or environment. The method 600 then includes a final step 624 of transferring a completed status back to the instance of the workflow execution on successful virtual task completion. Here, the status and state data from the virtual collaborative environment is transferred back to the workflow execution.

Figure 7:
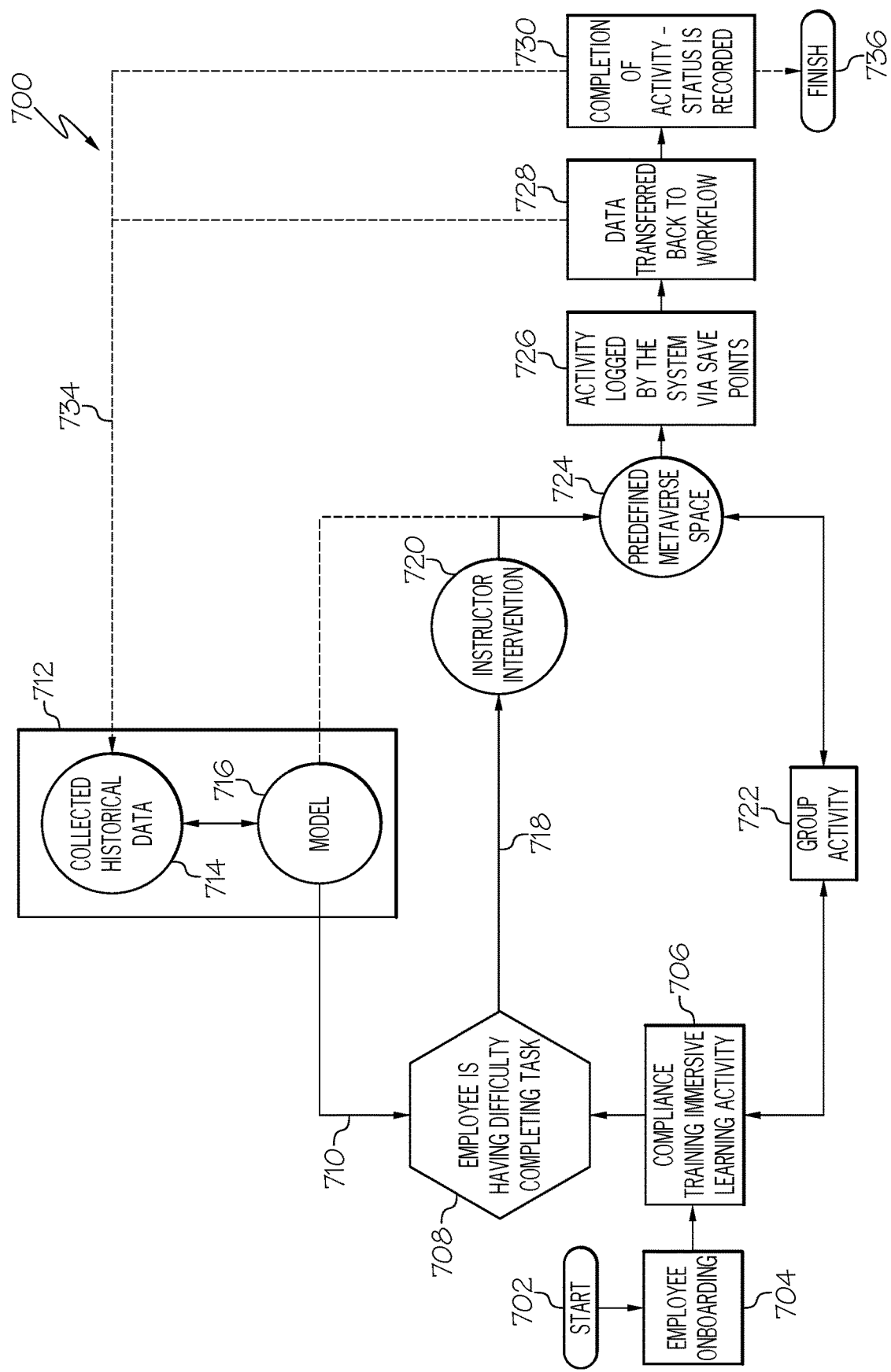
FIG. 7 depicts an exemplary process flow architecture for virtual spaces triggered by an exception in the workflow, in accordance with embodiments of the present invention.

FIG. 7 depicts a process flow architecture 700 for virtual spaces as a planned workflow activity, in accordance with embodiments of the present invention. The architecture 700 will be described with reference to a particular exemplary embodiment in the context of an employee onboarding process. As part of the process flow architecture 700, the process includes a start point 702, whereby an employee onboarding process 704 is begun. The onboarding process 704 may relate to an employee onboarding to a new organization or company, or a new project or team within an existing organization or company. The process flow architecture 700 then includes a compliance and training immersive learning activity system 706, which may be a part of an intelligent workflow framework, as discussed herein above. As part of the onboarding, the intelligent workflow framework includes the employee having to complete mandatory training—for example, an Occupational Health and Safety training for the Oil and Gas industry or any other type of required training for an organization may be represented by the compliance and training immersive learning activity system 706. The training course, for example, may have a module with a hands-on component in the real world or an equivalent immersive experience that replicates the hands-on training experience involving completing an activity in the metaverse. As part of the training immersive learning activity system 706, the onboarding process would generate an event or first trigger in the overall intelligent workflow framework in order supplement the intelligent workflow framework by creating an instance of the training module in a predefined virtual collaborative space for the employee. This first trigger may occur when the employee reaches a particular predefined point of the intelligent workflow framework, or the like. Upon triggering the first trigger, the employee may be assigned to this virtual collaborative environment or space with permissions to enter, and may needs to perform one or more activities as defined by the training module through completion as part of the training immersive learning activity system 706.

As part of engaging in the immersive learning activity in the virtual collaborative environment, the employee generates an additional second trigger. This may occur when the training immersive learning activity system 706 determines 708 that the employee is having difficulty completing a task, for example, within a predetermined amount of time, based on an expression of frustration, or based on an inquiry by the employee for help. The second trigger may initiate a process for further assistance to be provided by the employee. For example, the second trigger may include the virtual collaborative environment to invite an additional user, e.g., an instructor, to join for assistance. Alternatively, the second trigger may include having other trainees join for a group activity.

The determination of the second trigger may be based on an intelligent workflow framework cognitive system 712 which may make the decision based on a cognitive model 716 trained by a corpus collected historical data 714, as described herein above. The cognitive model 716 and intelligent workflow framework cognitive system 712 may be in communication and may observe the virtual collaborative environment of the training immersive learning activity system 706, using the communication channel 710.

The system may generate the second trigger at a process flow 718 whereby an instructor intervention system 720 is triggered. Alternatively, if a group activity is necessary, a group activity system 722 may be generated. Whatever the embodiment, the predefined virtual collaborative space 724 is created with the required users after the second trigger. An instructor or supervisor might have access to other objects or scenes not visible to the current employee.

As the employee engages in the learning experience, the activity gets logged by the system via logging and save points 726. The state of the activity is preserved so that the employee can exit and return to the last point of completion.

This data gets transferred back to the workflow via integration APIs between the workflow and the virtual collaborative environment or space at a process 728. On completion of the learning activity at a process 730, the completion status is recorded and reported back to the intelligent workflow and the metaverse space instance is destroyed. After this step, the process architecture 700 includes a finish point 736.

Figure 8:
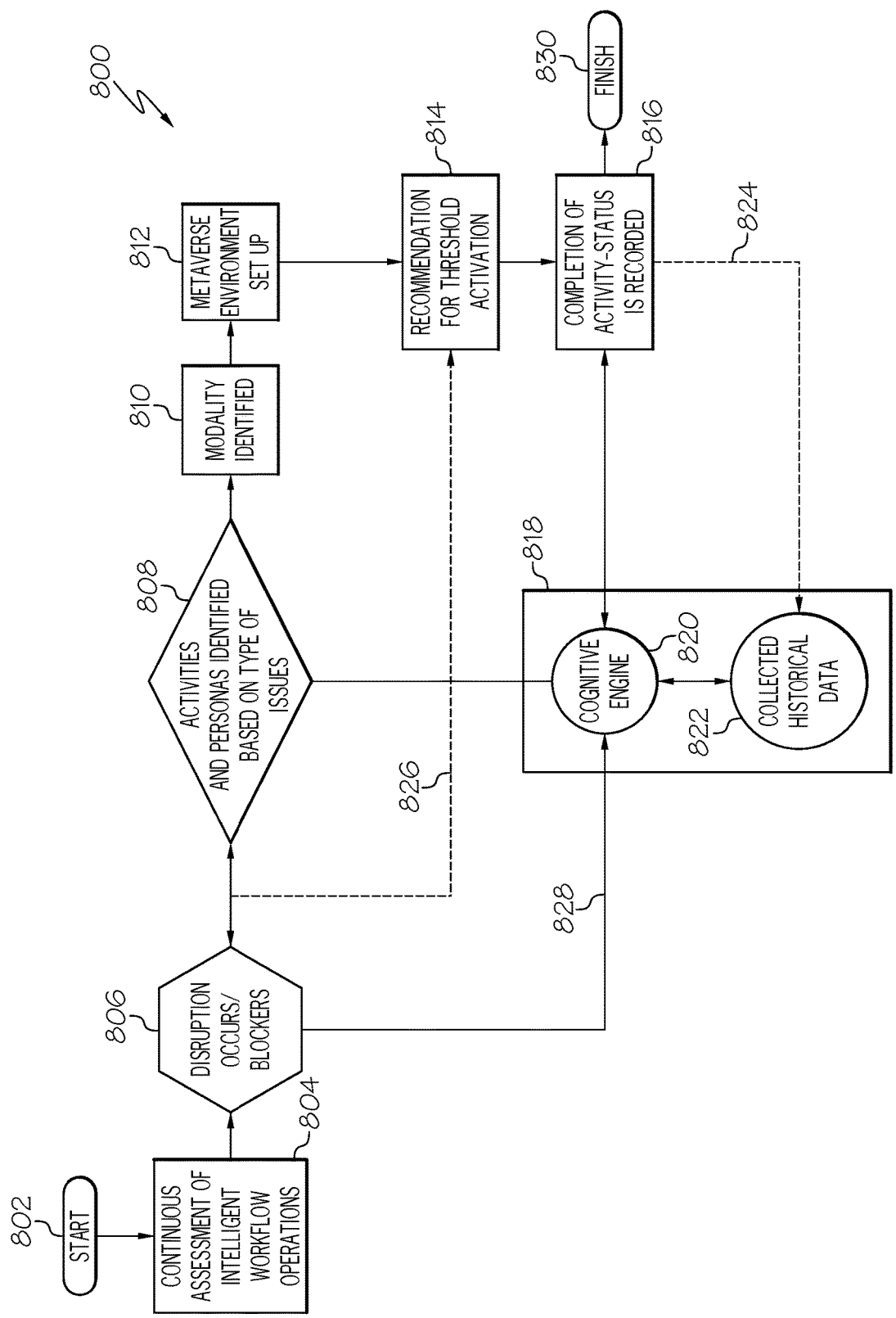
FIG. 8 depicts an exemplary process flow architecture for virtual spaces as a planned workflow activity, in accordance with embodiments of the present invention.

FIG. 8 depicts a process flow architecture 800 for virtual spaces triggered by an exception in the workflow, in accordance with embodiments of the present invention. The architecture 800 will be described with reference to a particular exemplary embodiment in the context of a distribution center.

Pursuant to the example, a first user is a manager in a distribution center. The first user is responsible for coordinating delivery vehicles, employee/driver route assignments, and understanding traffic patterns for optimal service—both from the customer and delivery worker perspective. In this example, the company which employs the first user has recently undergone a recent transformation in one or more of the work processes of the company. As a result of these recently undergone changes, what was previously a very slow and ineffective process has now become more streamlined and automated.

One day, the first user in the example is working from a remote location. The first user is able to monitor the overall workflow and distribution patterns by a laptop or remote device of the first user. The first user has stepped away from this laptop or remote device for the moment and is alerted, by a system of the present invention via a message on a mobile device (such as a watch or mobile phone), that there is a situation that has arisen. In particular, the first user is notified that there was a traffic accident with one of the delivery vehicles of the company. The first user is notified that no one is injured, but there are questions about who is responsible.

In this example, the first user has been tagged by the system as a point person to be onsite and understand the dynamics of the situation. While the first user is not able to travel to the actual scene, the first user is instead instructed by the system (through a prompt on the mobile device) to access a secure immersive space where the first user can meet others and replay the situation in a virtual collaborative environment.

The first user then enters via headset into a secure immersive and collaborative environment where the first user meets the additional users including a vehicle driver and a delivery worker associated with the incident. Further, a fourth user, a corporate attorney, has also been identified by the system and invited into the virtual collaborative space and therefore is also present. The four present users are then able to view the replay of the video obtained from the vehicle of the accident. The four users may also be able to simulate the accident by driving a digital twin of the delivery vehicle plus the other vehicles present on the scene. The system recreates the incident, and the people on the scene plus advisors (i.e. the first user manager and the corporate attorney) are able to communicate, recreate the event through digital twin and simulations, have cognitive computing provide insights into variables at play that may have been responsible for causation, and determine a strategy for how to respond.

Using this example, FIG. 8 includes a process start 802, whereby continuous assessment of an intelligent workflow operation of a distribution center is conducted by a process 804. At a process 806, a trigger occurs based on a disruption or blocker to the workflow. In the exemplary case above, this trigger would be the accident occurring by the first user. Such a disruption or trigger may be determined by a cognitive engine or model 820 based on collected historical data 822 within an intelligent workflow framework cognitive system 818. The intelligent workflow framework cognitive system 818 may be configured to monitor and/or observe the processes 804, 806 in order to provide cognitive issue assessment based on workflow issues which arise.

When such an issue is determined, the intelligent workflow framework cognitive system 818 may be configured to facilitate a process 808 whereby activities and personas are identified based on the type of issues. Here, it is determined by the system that team assembly in secured space is required for optimum understanding and response. Further, the users may be alerted and tagged to commune in the virtual collaborative space for immersion, or provided with timing on when to do so.

Next, a modality (i.e., a type of virtual collaborative environment) is identified at a process 810 which may be based on, in the example of the accident described above, repair needs, the type of event, involved parties, or based on a probability scoring.

Once processes 808, 810 have been completed, a metaverse environment (i.e., a virtual collaborative environment) may be set up or initiated at a process 812 by the system in order to analyze the event leading up to the disruption, exception or trigger. A recommendation for threshold activation process may occur at step 814 which may be based on a particular issue assessed at 826 related to the disruption or trigger 806. At a process 816, a completion of the activity within the metaverse environment occurs, whereby data is sent via information flow path 824 and a status is recorded within the collected historical data 822 repository of the intelligent workflow framework cognitive system 818. A communication back to the intelligent workflow framework cognitive system 818 is provided with data associated with new instrumentation data associated with the activity, communication in the activity, simulation within the activity, cognitive insights associated with the activity, and the like. From this information a cognitive issue assessment 828 may be made by the intelligent workflow framework cognitive system 818, and provided back to the intelligent workflow framework. Thus, the system captures the activity of the virtual collaborative environment and incorporates data gathered from this activity into the model associated with future intelligent workflow, whereby appropriate actions, variables, adjustments, and/or other considerations are tagged. Finally, the process flow architecture 800 includes a finish process 830 once a metaverse environment scenario is completed and data of such a scenario is recorded in the collected historical data 822 repository.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying, by one or more processors of a computer system within an existing workflow, the need for a virtual collaborative space where human interactions can occur to test or optimize the existing workflow;
   identifying, by the one or more processors of the computer system, triggers for when the virtual collaborative space shall be initiated based on historical learning models trained from instrumentation data generated by the existing workflow;
   responsive to a trigger from the identified triggers, alerting, by the one or more processors of the computer system, a first user to enter the virtual collaborative space;
   responsive to the trigger, initiating, by the one or more processors of the computer system, the virtual collaborative space;
   replicating, by the one or more processors of the computer system in the virtual collaborative space, a scenario that activated the trigger; and enabling, by the one or more processors of the computer system, the first user to address an issue in the existing workflow that caused the trigger to occur.

2. The computer-implemented method of claim 1, further comprising:
responsive to a second trigger within the virtual collaborative space, alerting, by the one or more processors of the computer system, a second user to enter the virtual collaborative space, wherein the second trigger is indicative that the first user is having difficulty completing a task in the scenario within a predetermined amount of time.

3. The computer-implemented method of claim 2, wherein the second user has access to additional objects and information within the scenario that are not visible to the first user.

4. The computer-implemented method of claim 1, further comprising:
logging, by the one or more processors of the computer system, activity by the first user in the scenario;
preserving, by the one or more processors of the computer system, a state of the activity of the first user in the scenario; and
transferring, by the one or more processors of the computer system, new instrumentation data associated with the activity of the first user in the scenario to the existing workflow.

5. The computer-implemented method of claim 1, wherein the replicating the scenario further comprises at least one of creating a digital twin and a simulation.

6. The computer-implemented method of claim 1, wherein the trigger is an unexpected event.

7. The computer-implemented method of claim 1, wherein the existing workflow includes ratings of severity and urgency levels.

8. A computer program product for creating a virtual collaborative space within an intelligent workflow framework, the computer program product comprising a computer readable hardware storage medium having program instructions embodied therewith, the program instructions readable by one or more processors of a computer system to cause the one or more processors to:
identifying, by the one or more processors of the computer system within an existing workflow, the need for the virtual collaborative space where human interactions can occur to test or optimize the existing workflow;
identifying, by the one or more processors of the computer system, triggers for when the virtual collaborative space shall be initiated based on historical learning models trained from instrumentation data generated by the existing workflow;
responsive to a trigger from the identified triggers, alerting, by the one or more processors of the computer system, a first user to enter the virtual collaborative space, wherein the trigger is an unexpected event;
responsive to the trigger, initiating, by the one or more processors of the computer system, the virtual collaborative space;
replicating, by the one or more processors of the computer system in the virtual collaborative space, a scenario that activated the trigger including identifying parties of interest to the scenario; and
enabling, by the one or more processors of the computer system, the first user to address an issue in the existing workflow that caused the trigger to occur.

9. The computer program product of claim 8, further comprising:
responsive to a second trigger within the virtual collaborative space, alerting a second user to enter the virtual collaborative space, wherein the second trigger is indicative that the first user is having difficulty completing a task in the scenario within a predetermined amount of time.

10. The computer program product of claim 9, wherein the second user has access to additional objects and information within the scenario that are not visible to the first user.

11. The computer program product of claim 8, further comprising:
logging, by the one or more processors of the computer system, activity by the first user in the scenario;
preserving, by the one or more processors of the computer system, a state of the activity of the first user in the scenario; and
transferring, by the one or more processors of the computer system, new instrumentation data associated with the activity of the first user in the scenario to the existing workflow.

12. The computer program product of claim 8, wherein the replicating the scenario further comprises at least one of creating a digital twin and a simulation.

13. The computer program product of claim 8, wherein the trigger is an unexpected event.

14. The computer program product of claim 8, wherein the existing workflow includes ratings of severity and urgency levels.

15. A computer system comprising:
one or more computer processors;
one or more computer readable storage media; and
computer readable code stored collectively in the one or more computer readable storage media, with the computer readable code including data and instructions to cause the one or more computer processors to perform at least the following operations:
identifying, by the one or more processors of the computer system within an existing workflow, the need for the virtual collaborative space where human interactions can occur to test or optimize the existing workflow;
identifying, by the one or more processors of the computer system, triggers for when the virtual collaborative space shall be initiated based on historical learning models trained from instrumentation data generated by the existing workflow;
responsive to a trigger from the identified triggers, alerting, by the one or more processors of the computer system, a first user to enter the virtual collaborative space;
responsive to the trigger, initiating, by the one or more processors of the computer system, the virtual collaborative space;
replicating, by the one or more processors of the computer system in the virtual collaborative space, a scenario that activated the trigger including identifying parties of interest to the scenario; and
enabling, by the one or more processors of the computer system, the first user to address an issue in the existing workflow that caused the trigger to occur.

16. The computer system of claim 15, further comprising:
responsive to a second trigger within the virtual collaborative space, alerting a second user to enter the virtual collaborative space, wherein the second trigger is indicative that the first user is having difficulty completing a task in the scenario within a predetermined amount of time.

17. The computer system of claim 16, wherein the second user has access to additional objects and information within the scenario that are not visible to the first user.

18. The computer system of claim 15, further comprising:
   logging, by the one or more processors of the computer system, activity by the first user in the scenario;
   preserving, by the one or more processors of the computer system, a state of the activity of the first user in the scenario; and
   transferring, by the one or more processors of the computer system, new instrumentation data associated with the activity of the first user in the scenario to the existing workflow.

19. The computer system of claim 15, wherein the replicating the scenario further comprises at least one of creating a digital twin and a simulation.

20. The computer system of claim 15, wherein the trigger is an unexpected event and
   wherein the existing workflow includes ratings of severity and urgency levels.

\* \* \* \* \*